United States Patent
DeSota et al.

(10) Patent No.: US 6,848,026 B2
(45) Date of Patent: Jan. 25, 2005

(54) CACHING MEMORY CONTENTS INTO CACHE PARTITIONS BASED ON MEMORY LOCATIONS

(75) Inventors: Donald R. DeSota, Portland, OR (US); Adrian C. Moga, Portland, OR (US); Carl E. Love, Beaverton, OR (US); Russell M. Clapp, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 10/010,788

(22) Filed: Nov. 9, 2001

(65) Prior Publication Data

US 2003/0093622 A1 May 15, 2003

(51) Int. Cl.$^7$ .......................... G06F 12/00; G06F 12/02
(52) U.S. Cl. ..................... 711/129; 711/118; 711/133; 711/153; 711/159; 711/170; 711/173
(58) Field of Search ................. 711/118, 129, 711/133, 134, 153, 159, 170, 173, 136, 160

(56) References Cited

U.S. PATENT DOCUMENTS

| | | | | |
|---|---|---|---|---|
| 5,293,609 A | | 3/1994 | Shih et al. | |
| 5,394,531 A | * | 2/1995 | Smith | 711/136 |
| 5,537,635 A | * | 7/1996 | Douglas | 711/129 |
| 5,699,543 A | | 12/1997 | Saxena | |
| 5,761,717 A | | 6/1998 | Vishlitzky et al. | |
| 5,978,888 A | * | 11/1999 | Arimilli et al. | 711/128 |
| 6,035,375 A | * | 3/2000 | Yanai et al. | 711/129 |
| 6,324,632 B1 | * | 11/2001 | McIntosh-Smith | 711/173 |
| 6,347,358 B1 | * | 2/2002 | Kuwata | 711/113 |
| 6,381,676 B2 | * | 4/2002 | Aglietti et al. | 711/133 |
| 6,425,058 B1 | * | 7/2002 | Arimilli et al. | 711/134 |
| 6,434,669 B1 | * | 8/2002 | Arimilli et al. | 711/128 |
| 6,453,385 B1 | * | 9/2002 | Sturges et al. | 711/129 |
| 6,594,729 B1 | * | 7/2003 | Sturges et al. | 711/129 |
| 6,681,295 B1 | * | 1/2004 | Root et al. | 711/128 |
| 2002/0007442 A1 | * | 1/2002 | Farrall et al. | 711/134 |
| 2003/0070046 A1 | * | 4/2003 | Dwyer et al. | 711/128 |

* cited by examiner

Primary Examiner—Mano Padmanabhan
Assistant Examiner—Jasmine Song
(74) Attorney, Agent, or Firm—Law Offices of Michael Dryja; Abdy Raissinia

(57) ABSTRACT

Caching memory contents into cache partitions based on their locations is disclosed. A location of a line of memory to be cached in a cache is determined. The cache is partitioned into a number of cache sections. The section for the line of memory is determined based on the location of the line of memory as applied against a memory line location-dependent allocation policy. The line of memory is then stored in the section of the cache determined.

20 Claims, 5 Drawing Sheets

CACHING MEMORY CONTENTS INTO CACHE PARTITIONS BASED ON MEMORY LOCATIONS

BACKGROUND OF THE INVENTION

1. Technical Field

This invention relates generally to computer systems having data and/or instructions stored in a memory, and more particularly to such systems in which the data and/or instructions can also be temporarily stored from the memory into a cache.

2. Description of the Prior Art

Most modern computer systems include a processor and memory, among other components. Data and instructions required for processing by the processor are retrieved from the memory. The processor can then store the results of its processing back into the memory. Among different types of processors in a given computer system, there usually is a central processing unit (CPU), which is the main processor for the system. Multi-processor systems contain multiple processors, with no one processor designated as the CPU.

Memory access by a processor, however, can be slow. Generally, there is a latency associated with each kind of memory, which refers to the length of time from when a processor first requests data or an instruction stored in the memory, to when the processor actually receives the data or the instruction from the memory. Different memory within a computer system may have different latencies. Usually the processor itself can process instructions and perform actions faster than the memory can provide data and instructions to the processor. This can cause processors to stall when waiting for memory responses, resulting in less than ideal performance.

To alleviate this problem, many computer systems include one or more caches. A memory cache, or processor cache, is a memory bank that bridges the main memory and a processor. It is faster than the main memory and allows instructions to be fetched and data to be read at higher speeds. The cache essentially contains a subset of the data and instructions that can be found in memory. Instructions and data may be transferred to the cache in blocks, using a look-ahead algorithm. The more sequential the instructions in the routine being accessed, and the more sequential the order of the data being read, the greater the chance the next desired item will still be in the cache, and the greater the improvement in performance. Data reuse also contributes to cache effectiveness. The more often data is reused, the higher the probability it will be in the cache. If data is used infrequently or there is a lot of time between consecutive reuses, there is a low probability it will remain in the cache.

Two common types of caches are known as level 1 (L1) cache and level 2 (L2) cache. An L1 cache is a memory bank built into the processor itself. An L2 cache is a secondary staging area that feeds the L1 cache. Increasing the size of the L2 cache may speed up some applications but may have no effect on others. An L2 cache may be built into the same chip as the processor, reside on a separate chip in a multi-chip package module, or be a separate bank of chips. Caches are typically static random-access memory (SRAM), whereas main memory is generally some variety of slower, more dense dynamic random-access memory (DRAM). Caches may also be provided at higher levels, such as level 3 (L3), and so on, and may also be shared by multiple processors in a multi-processor system.

Standard cache allocation policies replace the contents of the cache usually without regard to memory utilization or latency. For example, a least recently used (LRU) policy may replace the data or instruction that was least recently used with a new data or instruction that has been retrieved from memory. Such policies do not concern themselves with how often the newly stored data or instruction may actually be accessed, nor with the latency of retrieving this data or instruction from the memory itself. This can lead to a slowdown in system performance, due to ineffective use of the cache.

For example, in streaming data applications, such as streaming video or streaming audio applications, the data retrieved from the memory is usually used only once, and then not used again. A typical cache will dutifully cache this data, however, as it is retrieved by the processor. This negates the usefulness of the cache, because the cache is desirably meant for data that will be used often by the processor. Online transaction processing also tends to have large sets of data that are used infrequently and a small set of data that is used frequently.

As another example, some memory of the system may be high-speed memory, with relatively low latencies. Caching the contents of such memory, as compared to caching the contents of higher-latency memory, may cause an overall decrease in system performance. This is because the performance benefits of caching lower-latency memory are less than those of caching higher-latency memory. A typical cache, however, does not discern the latency of memory when caching data or instructions from the memory.

For these described reasons, as well as other reasons, there is a need for the present invention.

SUMMARY OF THE INVENTION

The invention relates to caching memory contents into cache partitions based on their locations. In a method of the invention, a location of a line of memory to be cached in a cache is determined. The cache is partitioned into a number of cache sections. The section for the line of memory is determined based on the location of the line of memory as applied against a memory line location-dependent allocation policy. The line of memory is then stored in the section of the cache determined.

In a system of the invention, there is a cache, a number of cache sections, an allocation policy, and a mechanism. The cache is for caching lines of memory, including a line to be cached. The cache is partitioned into the number of cache sections. The allocation policy specifies which of the lines of memory are allocated to which of the cache sections, based on locations of the lines of memory. The mechanism determines the section for the line of memory to be cached based on a location of the line as applied against the allocation policy. The mechanism then stores the line of memory in the section determined.

An article of manufacture of the invention includes a computer-readable medium and means in the medium. The means in the medium is for determining one of a number of cache sections into which a cache has been partitioned to store a line of memory to be cached. The means makes this determination based on a location of the line of memory as applied against a memory line location-dependent cache allocation policy. The means is also for storing the line of memory in the section determined. Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
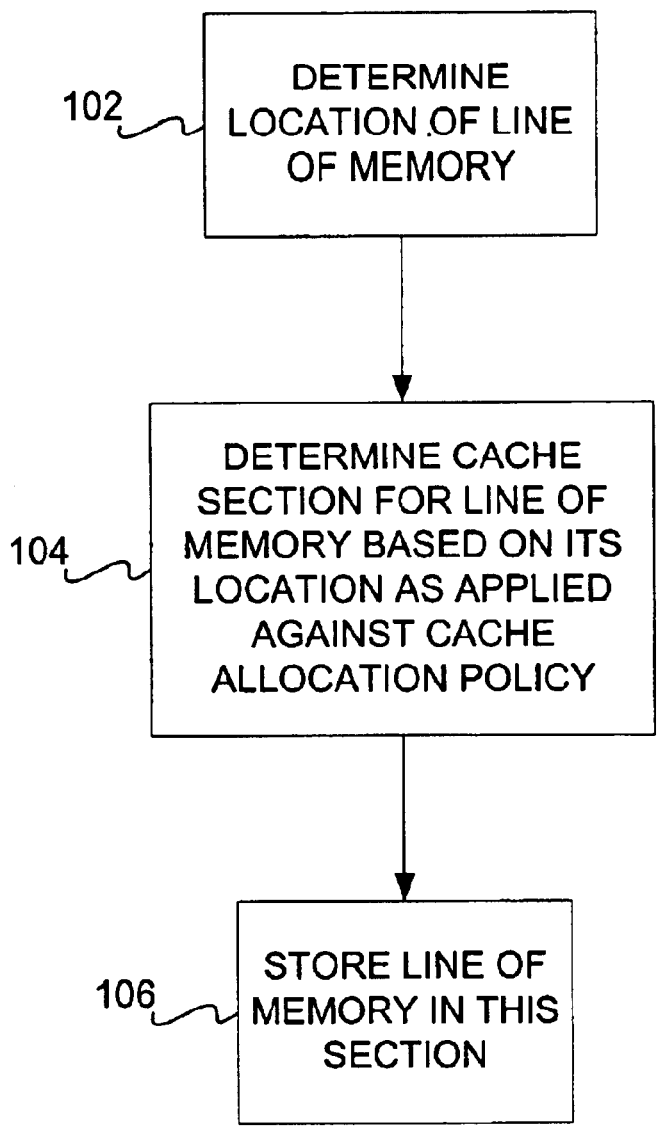
FIG. 1 is a flowchart of a method according to a preferred embodiment of the invention, and is suggested for printing on the first page of the issued patent.

FIG. 1 shows a method 100 according to a preferred embodiment of the invention. The method 100 indicates the manner by which the preferred embodiment can cache memory contents in different cache sections into which a cache has been partitioned, based on the locations of the memory contents as applied against a cache allocation policy. The method 100 can be implemented as a means in a computer-readable medium stored on an article of manufacture. The medium may be a recordable data storage medium, or another type of medium. Other components described in the detailed description can also be implemented as such means.

First, a location of a line of memory to be cached in one of a number of sections into which a cache has been partitioned is determined (102). A line of memory generally refers to a part of the memory, where the memory can be divided into separate lines. A line may be a byte of memory, a word of memory, and so on, in different embodiments of the invention. Each line of memory is preferably addressable by a unique address that specifies a particular location in the memory. That is, the location of the line of memory is preferably, but not necessarily, the unique address of the line of memory.

The cache is partitioned into a number of cache sections. The cache sections may be the same size, or more likely, may be differently sized. A memory line location-dependent cache allocation policy determines which lines of memory are to be cached in which of these cache sections, based on the locations of the lines of memory. For example, streaming multimedia data that is stored in certain locations of the memory may be allocated for caching in a relatively small section of the cache, whereas other, highly utilized data that is stored in other locations of the memory may be allocated for caching in a relatively large section of the cache. The cache allocation policy, as well as the size of each cache partition, may each be statically set, or may dynamically change over time.

The method 100 determines the cache section for the line of memory to be cached, based on its location as applied against the cache allocation policy (104). That is, the location of the line of memory dictates in which section of the cache it is to be stored. The line of memory is then stored in this cache section (106). The method 100 thus achieves caching different memory lines into different cache sections based on the locations of the memory lines. Memory lines having low latency and/or infrequent usage may be allocated to a relatively small cache section, based on their locations in memory, so that not many such lines are cached in the cache. Conversely, memory lines having high latency and/or frequent usage may be allocated to a relatively large cache section, based on their locations in memory, so that many such lines are cached.

Technical Background

Figure 2:
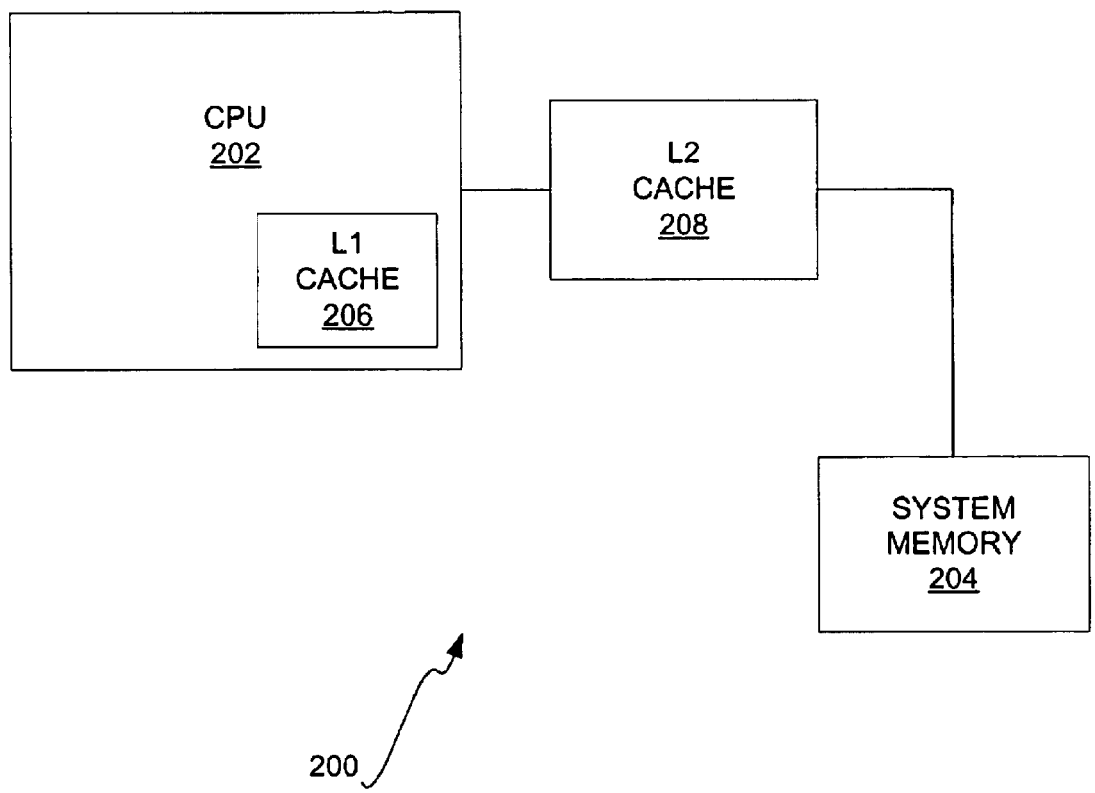
FIG. 2 is a diagram of a computer system in conjunction with which embodiments of the invention may be implemented.

FIG. 2 shows one example of a computer system 200 in conjunction with which embodiments of the invention may be practiced. Other computer systems may also be used in conjunction with embodiments of the invention. Only those components of the computer system 200 relevant to embodiments of the invention are illustrated, and other components may be included in the system 200 that are not illustrated or described herein. The system 200 specifically includes a central processing unit (CPU) 202, system (main) memory 204, a level 1 (L1) cache 206, and a level 2 (L2) cache 208. Other computer systems that may be used in conjunction with embodiments of the invention include multi-processor systems that do specifically include a processor designated as the CPU, and/or systems that also have more or less levels of cache, such as a level 3 (L3) cache, and so on.

The CPU 202 is one type of processor, and the system 200 may include other types of processors as well, such as co-processors, mathematical processors, service processors, and so on. The system, or main, memory 204 is the primary memory in which data and computer instructions are stored for access by the CPU 202. The memory 204 may have different latencies, and desirably is significantly larger than the size of either the L1 cache 206 or the L2 cache 208. The term memory is used generally herein, and is meant to encompass any type of storage, such as hard disk drives, and so on, although the detailed description itself is particular to what is generally known as semiconductor or solid-state memories.

The L1 cache 206 as shown in FIG. 2 is within the CPU 202, and is smaller in size, but faster, than the L2 cache 208. The L1 cache 206 may alternatively be on a separate chip than the CPU 202, and so on. The L2 cache may or may not be located on the same chip as the processor. As indicated, it is larger in size, but slower, than the L1 cache 206. Embodiments of the invention can be implemented in conjunction with the L1 cache 206, the L2 cache 208, both the caches 206 and 208, and/or other types of caches as well, including shared caches in multiprocessor systems.

Cache Partitioning and System

Figure 3:
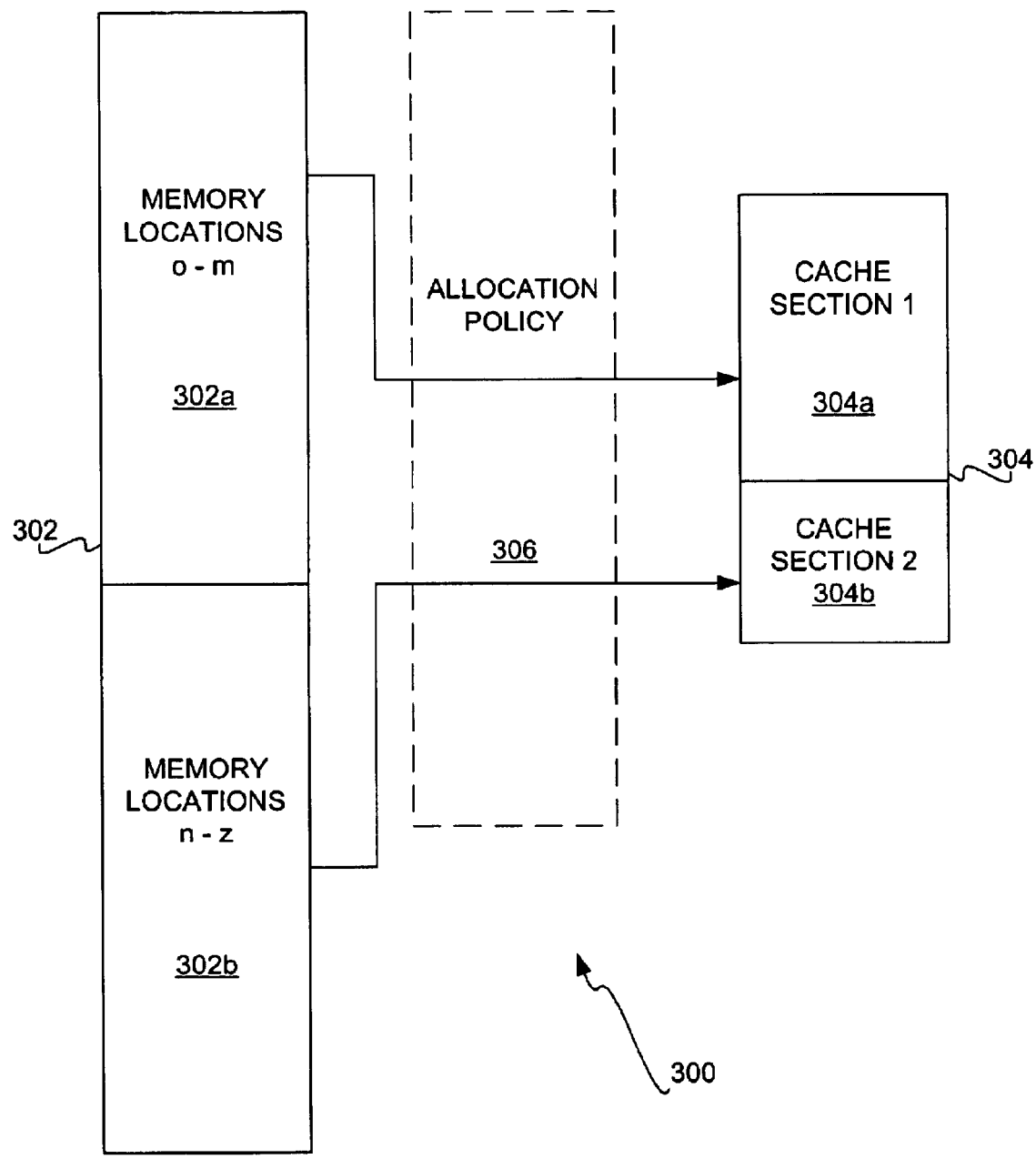
FIG. 3 is a diagram of a memory having a number of lines, each having a unique location in the memory, that are allocated to different cache sections into which a cache has been partitioned, as specified by a cache allocation policy, according to an embodiment of the invention.

FIG. 3 shows an example of partitioning a cache into different sections, and how different locations of a memory are allocated to different cache sections based on a cache allocation policy. In the system 300, a memory 302 is divided for sake of description into sections 302a and 302b, where memory section 302a covers lines having memory locations described as locations 0-m, and memory section 302b covers lines having memory locations described as locations n-z. For example, where locations of the memory 302 are specified by unique addresses, the memory section 302a may cover memory locations hexadecimal 0x0000 through hexadecimal 0xC000, and the memory section 302b may cover memory locations hexadecimal 0xC001 through 0xFFFF. The difference between these memory locations may be that those covered by the memory section 302a are high-latency memory, whereas those covered by the memory section 302b are low-latency memory, for instance.

The cache 304 is partitioned into two sections, the cache section 304a and the cache section 304b. The cache section 304a is larger than the cache section 304b, and thus the cache section 304a can cache a larger number of memory lines than the cache section 304b can. The memory line location-dependent cache allocation policy 306 specifies which lines of the memory 302 are cached in which of the sections 304a and 304b of the cache 304. As shown in FIG. 3, for example, the memory locations covered by the memory section 302a are allocated to the larger cache section 304a, whereas the memory locations covered by the memory section 302b are allocated to the smaller cache section 304b. This may be because the high-latency memory of the memory section 302a should be cached more often than the low-latency memory of the memory section 302b, for performance reasons.

As another example, the memory locations covered by the memory section 302a may have high temporal locality, and the memory locations covered by the memory section 302b may have low temporal locality. Therefore, the memory locations covered by the memory section 302a are allocated to the larger cache section 304a, whereas the memory locations covered by the memory section 302b are allocated to the smaller cache section 304b, for performance reasons. Furthermore, both the allocation policy 306 in terms of which memory locations are to be cached by which cache sections 304a and 304b, and the sizes of the cache sections 304a and 304b, can be static or dynamic.

Figure 4:
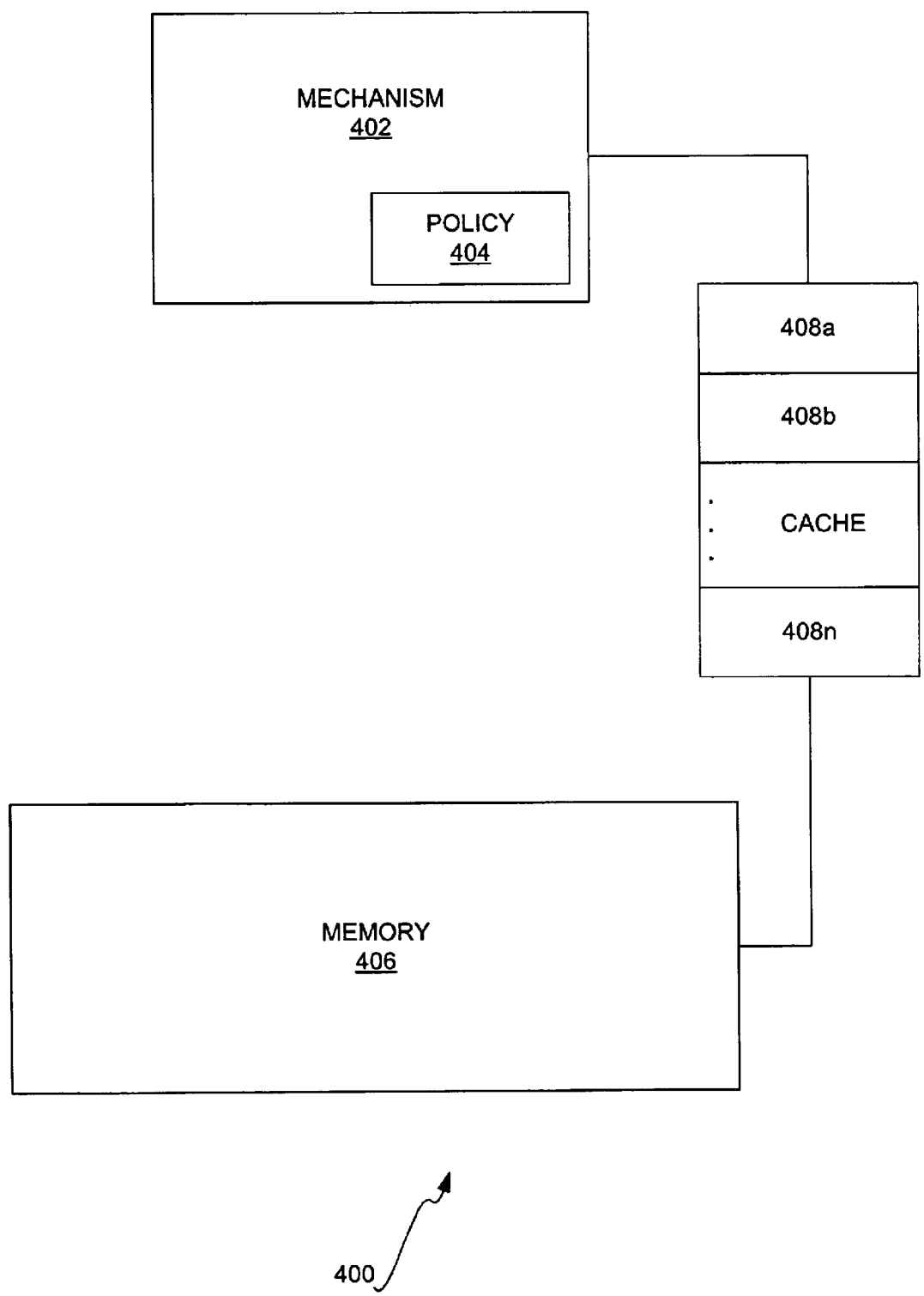
FIG. 4 is a diagram of a system for storing lines of memory in different cache sections into which a cache has been partitioned, as specified by a cache allocation policy, according to an embodiment of the invention.

FIG. 4 shows a system 400 according to an embodiment of the invention. The system 400 includes a mechanism 402 that has a memory line location-dependent cache policy 404, a memory 406, and a cache 408. The memory 406 has a number of different lines, each of which has a unique location, such as a unique address. The cache 408 is partitioned into a number of cache sections 408a, 408b, . . . , 408n, which may be differently sized. The allocation policy 404 specifies which of the lines of the memory 406 are allocated to which of the cache sections 408a, 408b, . . . , 408n, based on the locations of the lines of the memory 406.

For a line of the memory 406 to be cached in the cache 408, the mechanism 404 determines to which of the sections 408a, 408b, . . . , 408n the line has been allocated by applying the line's location against the allocation policy 404. The mechanism 404 then stores this line of the memory 406 in the determined cache section. The mechanism 404 may also periodically adjust the allocation policy 404 and/or the sizes of the cache sections 408a, 408b, . . . , 408n, if the policy 404 and/or the cache section sizes are dynamic and not static. The mechanism 404 can further perform any of the functionality of a method according to an embodiment of the invention, such as the method 100 of FIG. 1 that has been described, and the method 500 of FIG. 5 that will be described.

Method

Figure 5:
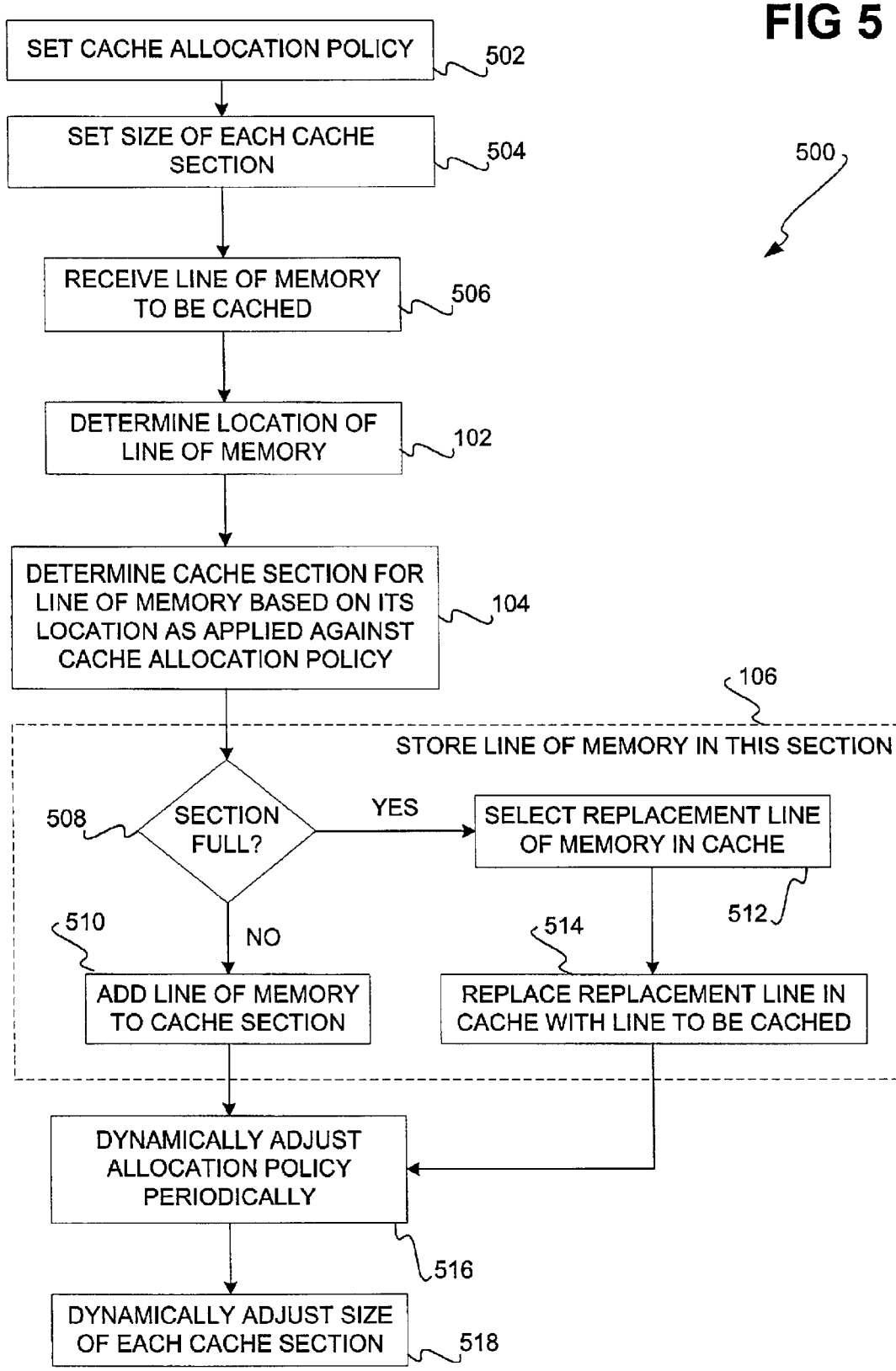
FIG. 5 is a flowchart of a method according to an embodiment of the invention that is more detailed than the method of FIG. 1, but is still consistent with the method of FIG. 1.

FIG. 5 is a flowchart of a method 500 according to an embodiment of the invention. The method 500 is more detailed than but still consistent with the method 100 of FIG. 1. As has been indicated, at least some functionality of the method 500 can be implemented as a means in a computer-readable medium of an article of manufacture. As has also been indicated, at least some functionality of the method 500 can be performed by the mechanism 402 of the system 400 of FIG. 4.

First, a memory line location-dependent cache allocation policy is set (502), and the size of each of a number of cache sections into which a cache has been partitioned is set (504). A line of memory to be cached is then received (506). This may be a line of memory that has been requested and received or otherwise retrieved by a processor, for example. The location of the line of memory is determined (102), by, for instance, examining or otherwise determining the address for the line in memory. The cache section for the line is also determined, based on its location as applied against the cache allocation policy (104). For instance, the cache section to which the location of the line of memory is allocated according to the cache allocation policy is determined.

The line of memory is then stored in this section of the cache (106). This is accomplished first by determining whether the section is full (508). If the cache section is not full, the line of memory is simply added to this section (510). However, if the cache section is full, then a replacement line of memory that is currently stored in this cache section is selected (512). For example, the least recently used (LRU) of the lines of memory stored in the cache section may be selected as the replacement line. Other policies, approaches, and algorithms may also be used to select the replacement line of memory. The replacement line is then replaced by the line of memory to be stored in the section of the cache (514).

The method 500 proceeds to dynamically adjust the allocation policy on a periodic basis (516). This is optional, and is performed only where the allocation policy is not static. The allocation policy is adjusted to change which of the lines of memory are allocated to which of the sections of the cache, based on the locations of the memory lines. Such adjustment may be performed based on the temporal locality of the memory line locations allocated to each cache section, as has been monitored over time; based on the reutilization of the memory line locations allocated to each cache section, as has been monitored over time; or, based on other or additional factors.

The method 500 can also dynamically adjust the size of each section into which the cache has been partitioned on a periodic basis (518). This is optional as well, and is performed only where the sizes of the cache sections are not static. The sizes of the cache sections are adjusted to essentially allocate more or less of the cache to particular lines of memory based on the locations of the memory lines. Such adjustment may be performed based on the utilization of each cache section, as has been monitored over time; based on fullness of each cache section, as has been monitored over time; or, based on other or additional factors. The method 500 is then done.

Advantages Over the Prior Art

Embodiments of the invention allow for advantages over the prior art. Embodiments of the invention provide for caching differently located lines of memory in different sections of a cache. This means that, for example, memory from one location may be cached in one section, whereas memory from another location may be cached in another section. Ultimately, such cache partitioning allows for more efficient use of the cache. Low-latency and/or infrequently used memory, or its contents, may be allocated for caching to a much smaller cache section than high-latency and/or frequently used memory, such that the former kind of memory does not flush the latter type of memory from the cache when requested by the processor or otherwise received for caching.

Alternative Embodiments

It will be appreciated that, although specific embodiments of the invention have been described herein for purposes of illustration, various modifications may be made without departing from the spirit and scope of the invention. For example, embodiments of the invention have been substantially described in relation to solid-state or semiconductor memories. However, the term memory has been used generally herein, such that it is inclusive of other types of storage, such as hard disk drives, and so on, as well. Accordingly, the scope of protection of this invention is limited only by the following claims and their equivalents, as their claim limitations in some instances have been specifically defined in the detailed description.

We claim:

1. A method comprising:
   determining a location of a line of memory to be cached in a cache partitioned into a plurality of cache sections;
   determining a section for the line of memory as one of the plurality of cache sections, based on the location of the line of memory as applied against a memory line location-dependent cache allocation policy, the policy specifying which lines of memory are to be allocated to and stored at which of the plurality of cache sections based on the locations of the lines of memory; and,
   storing the line of memory in the section determined.

2. The method of claim 1, further comprising dynamically adjusting a size of each of the plurality of cache sections.

3. The method of claim 2, wherein dynamically adjusting the size of each of the plurality of cache sections comprises dynamically adjusting the size of each of the plurality of cache sections based on one or more of: utilization of each of the plurality of cache sections; and, fullness of each of the plurality of cache sections.

4. The method of claim 1, further comprising dynamically adjusting the memory line location-dependent cache allocation policy.

5. The method of claim 4, wherein dynamically adjusting the memory line location-dependent cache allocation policy comprises dynamically adjusting the memory line location-dependent cache allocation policy based on temporal locality of memory line locations allocated to each of the plurality of cache sections.

6. The method of claim 1, wherein determining the location of the line of memory to be cached comprises examining an address of the line of memory.

7. The method of claim 1, wherein determining the section for the line of memory comprises determining the section of the plurality of cache sections to which the location of the line of memory is allocated according to the memory line Location-dependent cache allocation policy.

8. The method of claim 1, wherein storing the line of memory in the section determined comprises:
   in response to determining that the section is full,
      selecting a replacement line of memory in the section;
      replacing the replacement line of memory with the line of memory in the section;
   otherwise, adding the line of memory to the section.

9. The method of claim 1, further initially comprising:
   setting a size of each of the plurality of cache sections; and,
   setting the memory line location-dependent cache allocation policy.

10. The method of claim 1, wherein the plurality of cache sections comprises a first cache section and a second cache section, the first cache section larger than the second cache section, the cache allocation policy specifying the first cache section for caching lines of memory that have high temporal locality and the second cache section for caching lines of memory that have low temporal locality.

11. A system comprising:
   a cache for caching lines of a plurality of lines of memory including a line to be cached;
   a plurality of cache sections into which the cache is partitioned;
   an allocation policy specifying which of the plurality of lines of memory are allocated to which of the plurality of cache sections, based on locations of the plurality of lines of memory; and,
   a mechanism to determine a section of the plurality of cache sections for the line to be cached based on a location of the line as applied against the allocation policy, and to store the line in the section determined.

12. The system of claim 11, wherein the plurality of cache sections comprises a first cache section and a second cache section, the first cache section larger in size than the second cache section, the allocation policy specifying that the first cache section stores highly temporally local lines of memory and the second cache section stores lowly temporally local lines of memory.

13. The system of claim 11, wherein a size of each of the plurality of cache sections is static.

14. The system of claim 11, wherein the allocation policy is static.

15. The system of claim 11, wherein a size of each of the plurality of cache sections is dynamic, the mechanism periodically adjusting the size of each of the plurality of cache sections.

16. The system of claim 11, wherein the allocation policy is dynamic, the mechanism periodically adjusting the allocation policy.

17. An article comprising:
   a computer-readable medium; and,
   means in the medium for determining a section of a plurality of cache sections into which a cache has been partitioned to store a line of memory to be cached based on a location of the line of memory as applied against a memory line location-dependent cache allocation policy, and for storing the line of memory in the section determined, the policy specifying which lines of memory are to be allocated to and stored at which of the plurality of cache sections based on the locations of the lines of memory.

18. The article of claim 17, wherein the means is further for adjusting dynamically a size of each of the plurality of cache sections based at least on one or more of: utilization of each of the plurality of cache sections; and, tidiness of each of the plurality of cache sections.

19. The article of claim 17, wherein the means is further for dynamically adjusting the memory line location-dependent cache allocation policy based on temporal locality of memory line locations allocated to each of the plurality of cache sections.

20. The article of claim 17, wherein the medium is a recordable data storage medium.

* * * * *